US012731037B2

(12) United States Patent
Zhao et al.

(10) Patent No.: US 12,731,037 B2
(45) Date of Patent: Sep. 8, 2026

(54) VEHICLE OPERATION WITH MACHINE LEARNING

(71) Applicant: Ford Global Technologies, LLC, Dearborn, MI (US)

(72) Inventors: Ding Zhao, Pittsburgh, PA (US); Haohong Lin, Pittsburgh, PA (US); Yuming Niu, Northville, MI (US); Wenhao Ding, San Jose, CA (US); Zuxin Liu, Mountain View, CA (US); Kalpak Kalvit, Milpitas, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 18/792,095

(22) Filed: Aug. 1, 2024

(65) Prior Publication Data

US 2026/0037821 A1 Feb. 5, 2026

(51) Int. Cl.
*G06N 3/092* (2023.01)
*B60W 50/00* (2006.01)

(52) U.S. Cl.
CPC ......... *G06N 3/092* (2023.01); *B60W 50/0097* (2013.01)

(58) Field of Classification Search
CPC .......................... G06N 3/092; B60W 50/0097
See application file for complete search history.

(56) References Cited

U.S. PATENT DOCUMENTS

| | | | | |
|---|---|---|---|---|
| 10,726,279 | B1 | 7/2020 | Kim et al. | |
| 11,010,668 | B2 | 5/2021 | Kim et al. | |
| 2020/0311613 | A1* | 10/2020 | Ma | G06N 20/10 |

(Continued)

FOREIGN PATENT DOCUMENTS

| | | | |
|---|---|---|---|
| CN | 109709956 | B | 6/2021 |

OTHER PUBLICATIONS

Liu X. et al., Constrained Decision Transformer for Offline Safe Reinforcement Learning, Jun. 21, 2023, pp. 1-6 (Year: 2023).*

(Continued)

*Primary Examiner* — Navid Z. Mehdizadeh
*Assistant Examiner* — Caitlin R McCleary
(74) *Attorney, Agent, or Firm* — Frank A. MacKenzie; Brooks Kushman P.C.

(57) ABSTRACT

A computer that includes a processor and a memory, the memory including instructions executable by the processor to operate a system based on predictions output from the machine learning system including predicted states, actions, rewards, and costs, wherein the machine learning system includes a first transformer and a second transformer and is trained based on bisimulation offline reinforcement learning, wherein the first transformer and the second transformer are based on a Markov decision process that includes the states, the actions, the rewards, and the costs. The bisimulation offline reinforcement learning can include inputting a first sequences of training states, actions, rewards, and costs to the first transformer and a second sequence of the training states, actions, rewards, and costs to the second transformer to determine bisimulation learning objectives based on latent variables output from the first transformer and the second transformer.

20 Claims, 7 Drawing Sheets

(56) References Cited

U.S. PATENT DOCUMENTS

2022/0055689 A1* 2/2022 Mandlekar ........ B60W 60/0025

OTHER PUBLICATIONS

Huang Z. et al., Augmenting Reinforcement Learning With Transformer-Based Scene Representation Learning for Decision-Making of Autonomous Driving, Mar. 3, 2024, IEEE Transactions on Intelligent Vehicles, vol. 9, pp. 4405-4411 (Year: 2024).*

Jang H. et al., Dynamic Occupancy Grid Map with Semantic Information Using Deep Learning-Based BEVFusion Method with Camera and LiDAR Fusion, Apr. 29, 2024, MDPI, pp. 1-15 (Year: 2024).*

Shi, T., et al., "Offline Reinforcement Learning for Autonomous Driving with Safety and Exploration Enhancement," arXiv:2110.07067v2 [cs.RO] Nov. 2, 2021, 9 pages.

* cited by examiner

VEHICLE OPERATION WITH MACHINE LEARNING

BACKGROUND

Computers can operate systems and devices including vehicles, robots, drones, and/or object tracking systems. Data including images can be acquired by sensors and processed by a computer to determine a trajectory for a system with respect to an environment and with respect to objects in the environment. A computer may use the trajectory to operate the system or operate components thereof in the environment.

DETAILED DESCRIPTION

Figure 1:
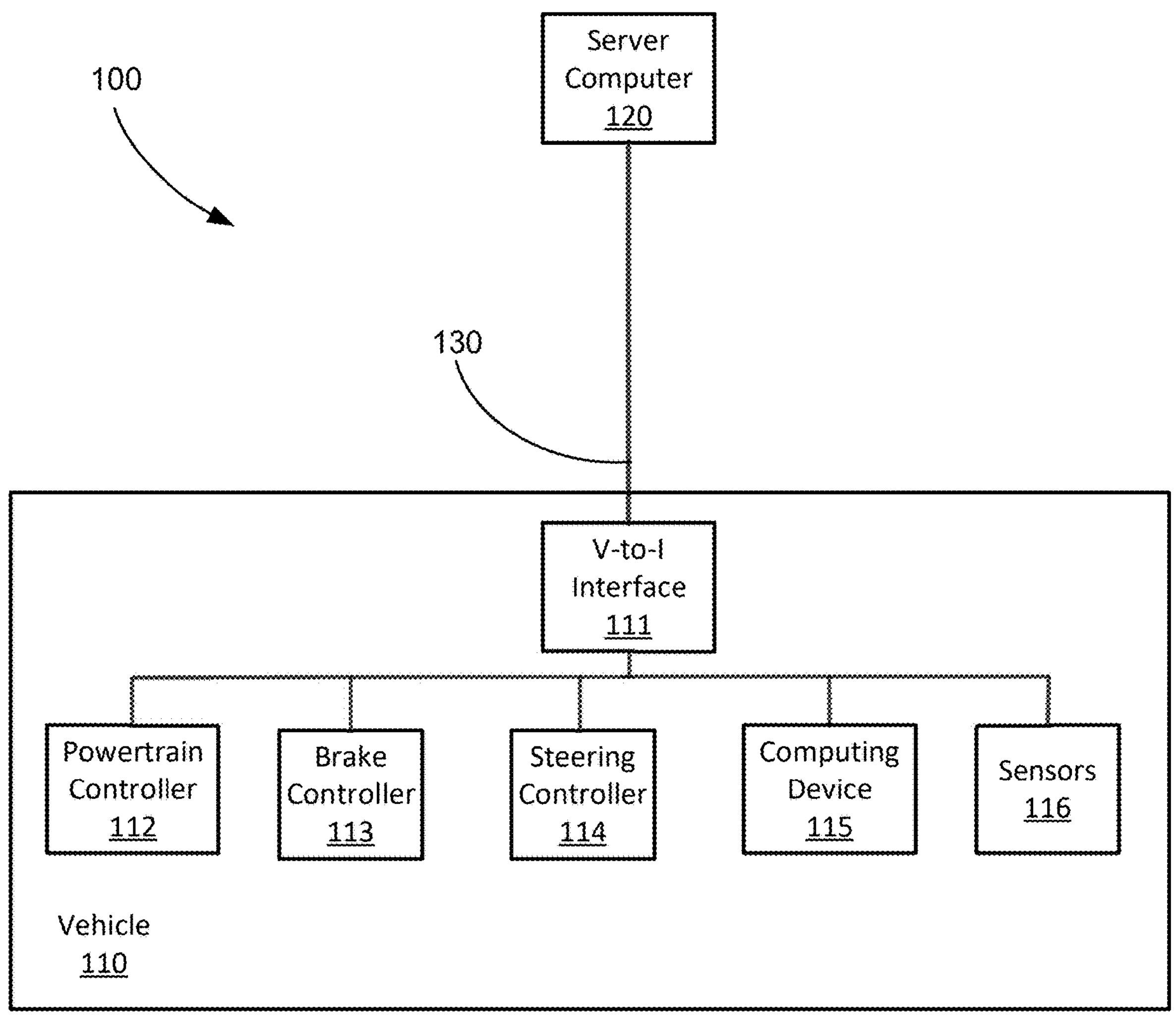
FIG. 1 is a block diagram of an example vehicle system.

Systems that move and/or that have mobile components, including vehicles, robots, drones, cell phones etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece without encountering the other robot's arm. In another example, a vehicle could determine its location with respect to an environment around the vehicle and locations of objects such as the roadway and other vehicles in the environment. The vehicle could use its determined location and the determined locations of the objects to determine a path upon which to operate while maintaining a predetermined relationship to the objects. Vehicle operation will be used herein as a non-limiting example of object identity and location determination in the description below.

A machine learning system can be trained and installed in a computing device in a vehicle to receive sensor data from sensors included in the vehicle. The machine learning system can determine predictions regarding the received sensor data to assist in operating the vehicle. For example, a machine learning system can be trained to receive images from video cameras and lidar sensors and determine a predicted state for the vehicle. A predicted state output from the machine learning system can include predicting a location of the vehicle with respect to the environment and predicted distances between the vehicle and objects, including other vehicles, in the environment. The vehicle location prediction can be used by the computing device to determine a trajectory that the vehicle could travel on to reach a predicted future location. The computing device can then direct the vehicle to travel on the trajectory by issuing commands to controllers which operate vehicle components such as propulsion, steering, and brakes as described below in relation to FIG. 1.

Obtaining useful results from a trained machine learning system can depend upon the ability of a machine learning system to generalize a training dataset to real world input data. Useful results in the context of this application are results that are efficient for operation of a moving device (a vehicle, in examples herein) and bounded, that is, take into account objects, such as other vehicles that the moving device might encounter. Efficiency is typically measured according to forward movement of a vehicle, that is, movement in a vehicle longitudinal direction, maintaining vehicle speed, and/or reaching a vehicle goal, where the goal is defined as a location in the environment. Bounded results are measured or determined by whether the vehicle contacts objects including other vehicles in the environment, whether the vehicle follows a planned or desired path, e.g., stays on a roadway, and/or whether the vehicle observes specifies speeds, e.g., stays below or does not continuously maintain a specified upper limit on vehicle speed. Techniques for offline bisimulation reinforcement learning based on context sequences as described below in relation to FIGS. 2-4 and bisimulation as described below in relation to FIGS. 5 and 6 can train machine learning systems to generate efficient predictions for operating vehicles that maintain limits specified to define bounded operation.

Reinforcement learning can be used to train a machine learning system to determine predictions regarding a vehicle's environment including a location of the vehicle in the environment and locations of objects in the environment. Reinforcement learning is a type of learning by demonstration that uses recorded sequences of vehicle sensor data to train a machine learning system by example. The recorded sequence can be used to train a machine learning system by training the machine learning system to predict a state, which can include location, for a vehicle at a time t based on the state of the vehicle at a previous time t-1 by inputting examples of vehicle states at times steps from a time $t-H$ to time t where H is a small integer, for example 10 or less. Techniques for training machine learning systems described herein can enhance the ability a machine learning system to generalize from training data by providing context for the training. Context is defined as tuple that includes a state $s\in\mathcal{S}$, where $\mathcal{S}$ is the set of all possible states, actions $a\in\mathcal{A}$ where $\mathcal{A}$ is the set of all possible actions, and scalars r and c which are the reward and cost, respectively indicated by the state s and the action a. Context data is acquired at times $t-1$, $t-2$, . . . $t-H$, etc., e.g., multiple time steps in a sequence before the time being predicted. Providing training data as sequences of context data in reinforcement learning permits the machine learning system to generalize from training data to generate useful predictions based on real world data.

Sequences of context data in a training dataset can be prepared for training by modeling the data as a constrained contextual Markov decision process ($C^2$-MDP). A $C^2$-MDP models data sequences as states $s\in\mathcal{S}$, and actions $a\in\mathcal{A}$. Based on a state s, an action a, and a transition distribution of environmental dynamics $f(s'|s, a)$, the $C^2$-MDP transitions to a new state s' and emits a reward r and a cost c. The $C^2$-MDP can also include a discount factor $\gamma$ which, if specified to be less than one, will reduce the reward r at each step and permit the $C^2$-MDP to converge on a solution. An MDP is constrained when the MDP maximizes the cumulative reward while satisfying cost constraints. In the context of vehicle operation as described herein, rewards are defined as efficient operation including a forwarding reward for vehicle motion in the longitudinal direction, a continuous reward for vehicle speed and a sparse reward when the vehicle reaches a goal or destination. Costs include bounded vehicle operation which prohibit vehicle contact with an object, off-the-road motion, and exceeding a speed limit. An MDP is contextual when the current state transition from a previous state s at a time t−1 to a new state s' at time t is based not only on state s but also on a context C, which includes multiple sets of states, actions, rewards, and costs for historical states that occurred in a time sequence prior to the current timestep.

Training a machine learning system to generate states that can be used to operate vehicles can be enhanced by decomposing the state space into a disjoint state space. In examples described herein, the disjoint state space can include a video image, a lidar image, and a bird's-eye view image. Video images can be acquired by video sensors included in a vehicle. Video images can be used to identify and locate objects such as vehicles in an environment around a vehicle. Lidar images generated by a lidar sensor can be used to accurately determine distances from a vehicle to objects in an environment around a vehicle. Video images and lidar images can be combined with map data to generate bird's-eye-view images, which is a top-down view of an environment around a vehicle. These three imaging modalities (video, image, and bird's-eye view images) can respectively contribute different types of data regarding an environment around a vehicle to a machine learning system.

The disjoint states included in the $C^2$-MDP include a video image, a lidar image, and a bird's eye view (BEV) image that include overlapping views of the same portion of the environment around a vehicle. When installed in a computer in a vehicle, a machine learning system, trained as described herein, can input an input state acquired at a current time, designated t−1, and output a predicted state for a future time t that includes a predicted video image, a predicted lidar image, and a predicted BEV image that maximize reward and maintain cost within limits. The predicted state images can be used by the vehicle computer to determine a vehicle path upon which to operate the vehicle. The vehicle computer can direct controllers to control vehicle components to operate the vehicle on the determined vehicle path.

A method, is disclosed herein, including operating a system based on output from a machine learning system including predicted states, actions, rewards, and costs, wherein the machine learning system includes a first transformer and a second transformer and is trained based on bisimulation offline reinforcement learning. The first transformer and the second transformer can be based on a Markov decision process that includes the states, the actions, the rewards, and the costs. The bisimulation offline reinforcement learning can include inputting a first sequence of training states, actions, rewards, and costs to the first transformer and a second sequence of the training states, actions, rewards, and costs to the second transformer to determine bisimulation learning objectives based on latent variables output from the first transformer and the second transformer. The system can include a vehicle and operating the vehicle can include determining a vehicle trajectory based on the predicted states, actions, rewards, and costs output by the machine learning system. The Markov decision process can be a constrained contextual Markov decision process that includes multiple sets of the states, the actions, the rewards, and the costs included in a time sequence. The Markov decision process can include a transition dynamics distributions and a discount factor. Training the machine learning system can be based on the bisimulation offline reinforcement learning includes minimizing the bisimulation learning objectives based on the rewards, the costs, and transition dynamics distributions included in the latent variables from the first transformer and the second transformer that includes a Lagrangian multiplier for the costs and a 2-Wasserstein distance for the transition dynamics distributions.

The rewards can be based on one or more of a vehicle longitudinal direction, a vehicle speed and a vehicle goal. The costs can be based on one or more of not contacting objects including other vehicles, staying on a roadway, and maintaining an upper limit on vehicle speed. The states can be based on a disjoint state space that includes a video image, a lidar image, and a bird's-eye view image. The bird's-eye view image can be determined based on the video image and the lidar image. The first transformer and the second transformer can transform the states, the actions, the rewards, and the costs to the predicted state based on encoding the states, the actions, the rewards, and the costs to a multi-dimensional vector, applying multi-head attention included in a decoder to the multi-dimensional vector to generate latent variables, and inputting the latent variables to an encoder that generates an output prediction. The sequences of the training states, the training actions, the training rewards, and the training costs used to train the first transformer and the second transformer can be based on recorded real world data. The bisimulation offline reinforcement learning can include inputting two data sequences that satisfy a bisimulation metric. The bisimulation metric can be a mapping from a state space to a non-negative scalar. The bisimulation learning objective can be based on the bisimulation metric and a stop gradient of a state encoder.

Further disclosed is a computer readable medium, storing program instructions for executing some or all of the above method steps. Further disclosed is a computer programmed for executing some or all of the above method steps, including a computer apparatus, programmed to operate a system based on output from a machine learning system including predicted states, actions, rewards, and costs, wherein the machine learning system includes a first transformer and a second transformer and is trained based on bisimulation offline reinforcement learning. The first transformer and the second transformer can be based on a Markov decision process that includes the states, the actions, the rewards, and the costs. The bisimulation offline reinforcement learning can include inputting a first sequence of training states, actions, rewards, and costs to the first transformer and a second sequence of the training states, actions, rewards, and costs to the second transformer to determine bisimulation learning objectives based on latent variables output from the first transformer and the second transformer. The system can include a vehicle and operating the vehicle can include determining a vehicle trajectory based on the predicted states, actions, rewards, and costs output by the machine learning system. The Markov decision process can be a constrained contextual Markov decision process that includes multiple sets of the states, the actions, the rewards, and the costs included in a time sequence. The Markov decision process can include a transition dynamics distributions and a discount factor. Training the machine learning system can be based on the bisimulation offline reinforcement learning includes minimizing the bisimulation learning objectives based on the rewards, the costs, and transition dynamics distributions included in the latent variables from the first transformer and the second transformer that includes a Lagrangian multiplier for the costs and a 2-Wasserstein distance for the transition dynamics distributions.

The instructions can include further instructions wherein the rewards can be based on one or more of a vehicle longitudinal direction, a vehicle speed and a vehicle goal. The costs can be based on one or more of not contacting objects including other vehicles, staying on a roadway, and maintaining an upper limit on vehicle speed. The states can be based on a disjoint state space that includes a video image, a lidar image, and a bird's-eye view image. The bird's-eye view image can be determined based on the video image and the lidar image. The first transformer and the second transformer can transform the states, the actions, the rewards, and the costs to the predicted state based on encoding the states, the actions, the rewards, and the costs to a multi-dimensional vector, applying multi-head attention included in a decoder to the multi-dimensional vector to generate latent variables, and inputting the latent variables to an encoder that generates an output prediction. The sequences of the training states, the training actions, the training rewards, and the training costs used to train the first transformer and the second transformer can be based on recorded real world data. The bisimulation offline reinforcement learning can include inputting two data sequences that satisfy a bisimulation metric. The bisimulation metric can be a mapping from a state space to a non-negative scalar. The bisimulation learning objective can be based on the bisimulation metric and a stop gradient of a state encoder.

FIG. 1 is a diagram of a system 100. In this example, system 100 includes a vehicle 110, however, in other examples system 100 could include a robot, a drone, or an object tracking device. In examples where system 100 includes a robot, a drone, or an object tracking device, controllers 112, 113, 114 would be changes to controllers that control robot, drone, or object tracking device components. In examples described herein, system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of speed in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle communications bus as described further below, more than one computing devices, i.e., controllers or the like included in the vehicle 110 for monitoring and controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and control various vehicle 110 components and operations. For example, the computing device 115 may include programming to control vehicle 110 operational behaviors (i.e., physical manifestations of vehicle 110 operation) such as speed, steering, etc., as well as tactical behaviors (i.e., control of operational behaviors typically in a manner intended to achieve efficient traversal of a route) such as a distance between vehicles and amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and other sensors 116 and the geographical coordinates provided by the GPS sensor may be used by the computing device 115 to operate the vehicle 110 autonomously or semi-autonomously, for example.

The vehicle 110 is generally a land-based vehicle 110 capable of autonomous and semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, power applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
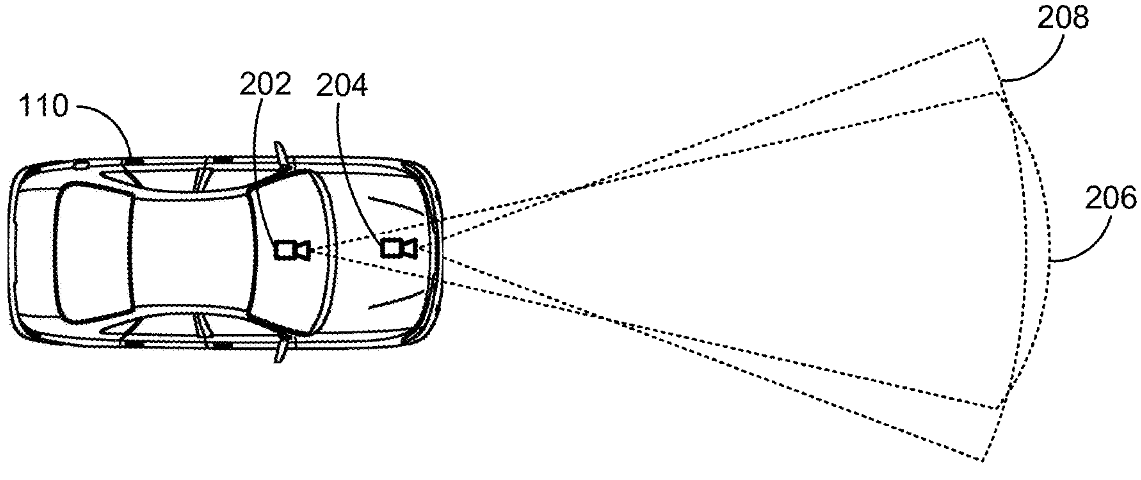
FIG. 2 is a diagram of an example vehicle including sensors.

FIG. 2 is a diagram of vehicle 110 including a video camera 202 having a field of view 206 and a lidar sensor 204 having a field of view 208. A field of view 206, 208 is a space in an environment around a vehicle within which the sensor can obtain data. The data acquired by a video camera 202 can be formatted as a video image and data acquired by a lidar sensor 204 can be formatted as a lidar image, for example. Acquired video and lidar images can be combined with map data acquired by computing device 115 from the Internet via network 130 or recalled from memory included in the computing device 115 to determine a bird's-eye-view (BEV) image. A BEV image is a top-down image of the fields of view 206, 208 of the video camera 202 and lidar sensor 204 formatted as map data. A video image, a lidar images and a BEV image can be received by a machine learning system included in a computing device 115 and processed to determine a predicted state regarding the environment around vehicle 110. The predicted state can include a video image, a lidar image, and a BEV image. A predicted state determined by a machine learning system can include predictions regarding identities and locations of objects such as roadways and other vehicles included in the environment.

Figure 3:
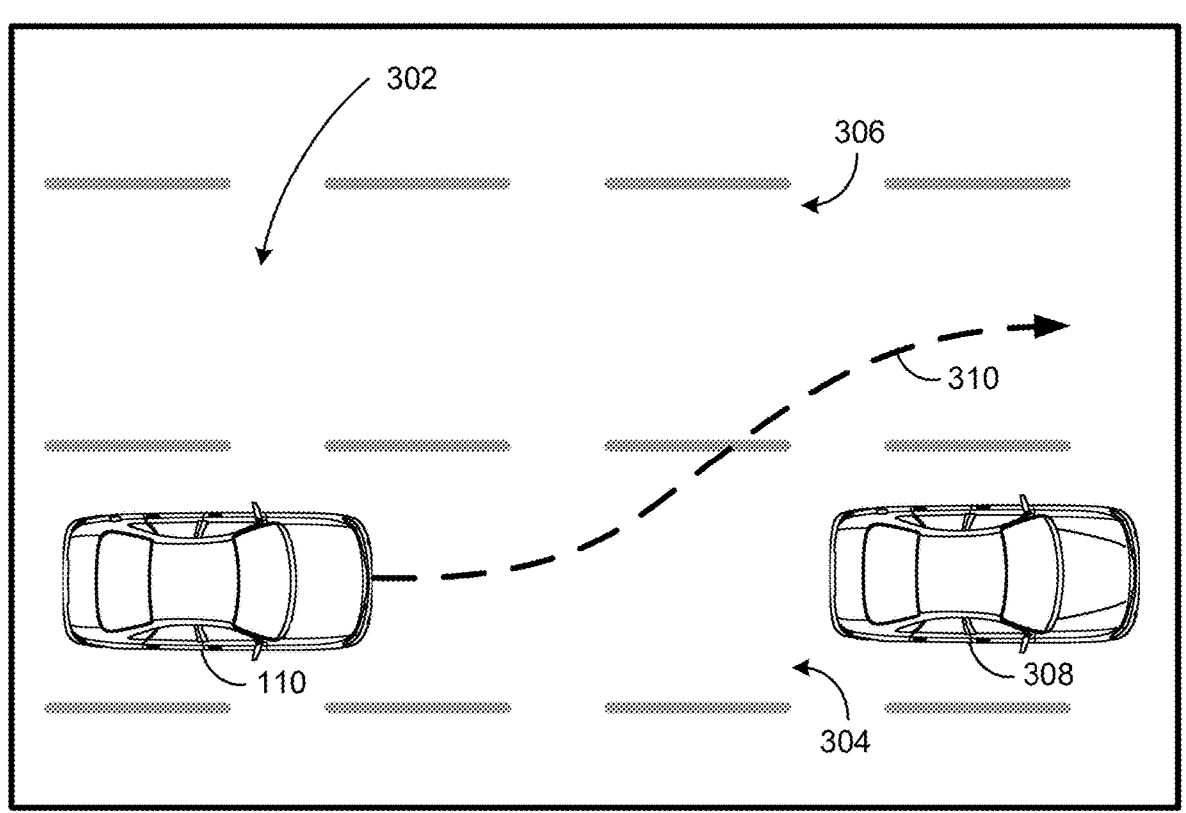
FIG. 3 is a diagram of an example traffic scene.

FIG. 3 is a diagram of an example BEV image 300 that includes a roadway 302 that includes a first lane 304 and a second lane 306. The first lane 304 includes vehicle 110 and a second vehicle 308. Vehicle 110 can include a computing device 115 that includes a machine vision system trained according to techniques described herein. By determining machine learning system predictions regarding the environment around vehicle 110, computing device 115 can determine a vehicle path 310 upon which to operate vehicle 110. A vehicle path 310 can be described by a polynomial function (which may be referred to as a "path polynomial") based on limits on rates of change in lateral and longitudinal speeds, for example. Vehicle 110 can be directed to operate on the vehicle path 310 by computing device 115 issuing commands to controllers 112, 113, 114, to actuate vehicle components.

A machine learning system can be trained on a server computer 120, for example, and transmitted to a computing device 115 on a vehicle 110 following training and used to operate the vehicle 110 based vehicle sensor 116 data. A machine learning system can be trained using a training data set of image data based on recorded real world data that has been previously acquired by sensor-equipped vehicles or other platforms. Sensor data in an acquired training dataset can be prepared for training by modeling the data as a constrained contextual Markov decision process ($C^2$-MDP). A $C^2$-MDP models data sequences as states $s \in \mathcal{S}$, the set of all states, which include the sensor data, and actions $a \in \mathcal{A}$, the set of all actions. Based on the state s and the action a, and a transition distribution of environmental dynamics $f(s'|s, a)$, and a discount factor $\gamma$, the $C^2$-MDP transitions to a new state s'. An MDP is constrained when the MDP maximizes the cumulative reward while satisfying cost constraints. In the current context of vehicle operation, rewards are defined as a forwarding reward for vehicle motion in the longitudinal direction, a continuous reward for vehicle speed and a sparse reward when the vehicle reaches a goal or destination. Costs include vehicle contact with an object or other vehicle, off-the-road motion, and exceeding a speed limit. An MDP is contextual when the current state transition from a previous state s at a time $t-1$ to a new state s' at time t is based not only on state s but also on a sequence of contexts C, which includes the states, transitions, actions, rewards, and costs for historical states that occurred at time steps prior to the current timestep.

A constrained contextual Markov decision process ($C^2$-MDP) is defined as a contextual MDP with a tuple ($\Omega$, $\mathcal{M}(\omega)$), where $\mathcal{M}$ is a function that maps any contexts $\Omega \in \Omega$ to a constrained MDP $\mathcal{M}(\omega)=(\mathcal{S}, \mathcal{A}, P_\omega, r \cdot c, s_0, \gamma)$. Here $P_\omega$: $\mathcal{S} \times \mathcal{A} \times \Omega$ is the context-specific transition dynamics function, r: $\mathcal{S} \times \mathcal{A} \rightarrow \mathbb{R}$ is the reward function, c: $\mathcal{S} \times \mathcal{A} \rightarrow \mathbb{R}$ is the cost function, $s_0$ is the initial state, and $\gamma$ is the discount factor applied to the reward. The $C^2$-MDP can model vehicle motion across traffic environments that vary in different contexts, e.g. road types and traffic densities, in different traffic scenarios. The goal of the $C^2$-MDP is to maximize a cumulative reward while satisfying cost under a target context $\omega$.

In this context, the reward function r at time t is determined by the equation:

$$\begin{aligned} r_t &= w_1^r r_{forward} + w_2^r r_{speed} + w_3^r r_{term} \\ &= w_1^r (d_t - d_{t-1}) + w_2^r v_t + w_3^r \mathbb{I}(s^t = g) \end{aligned} \tag{1}$$

Where the forward reward function $$w_1^r$$

is equal to the current distance in the longitudinal direction $d_t$ minus the previous distance $d_{t-1}$, the speed reward function $$w_2^r$$

is the current vehicle speed $v_t$ and the goal term $$w_3^r$$

is a value indicated by the current state $s^t$ being determined to be equal to a goal state g. The cost function c at time t is determined by the equation:

$$\begin{aligned} c_t &= w_1^c c_{contact} + w_2^c c_{out\,road} + w_3^c c_{overspeed} \\ &= w_1^c \mathbb{I}(s_t \in s_{contact}) + w_2^c \mathbb{I}(s_t \notin s_{road}) \\ &\quad + w_3^c \max(0, v_t - v_{limit}) \end{aligned} \tag{2}$$

Where contact cost is indicated by the current state $s_t$ being a state that included contact between the vehicle and an object, road cost in indicated by the current state not being included in the road states, and speed cost is the maximum of 0 or the amount that the current speed $v_t$ is greater than the speed limit $v_{limit}$.

Training a machine learning system to generate states that can be used to operate vehicles can be enhanced by decomposing the state space into disjoint subspaces. In examples described herein, the disjoint subspaces can include video images, lidar data, and bird's-eye view data. Video images can be acquired by video sensors included in a vehicle. Video images can be used to identify and locate objects such as vehicles in an environment around a vehicle. Lidar data can be used to accurately determine distances from a vehicle to objects in an environment around a vehicle. Video images and lidar data can be combined with map data to generate bird's-eye-view data, which is a top-down view of an environment around a vehicle. These three imaging modalities can each contribute different types of data regarding an environment around a vehicle to a machine learning system.

The disjoint states included in the $C^2$-MDP and input and output from the machine learning system include a video image, a lidar image, and a bird's eye view (BEV) image that include overlapping views of the same portion of the environment around vehicle 110. When installed in a computer in vehicle 110, a trained machine learning system, at inference time, can input a history of states, actions, rewards, and costs for a time steps t−H, . . . , t−1 and output a predicted action $a_t$, a predicted state $s_t$, a predicted reward $r_t$, and a predicted cost $c_t$ for time step t that maximizes reward and maintains cost within limits. The predicted action $a_t$ can be used by the vehicle computing device 115 to determine a vehicle path upon which to operate vehicle 110 that moves the vehicle 110 to a location indicated by predicted state $s_t$. The vehicle computing device 115 can direct controllers 112, 113, 114 to control vehicle components to operate the vehicle 110 on the determined vehicle path.

Figure 4:
FIG. 4 is a diagram of an example machine learning system.

FIG. 4 is a diagram of a machine learning system 400. The machine learning system that can determine predictions based on the $C^2$-MDP is referred to in the context of this application as a causal ensemble world model learning (CEWM) learning system. The CEWM includes a structured causal model (SCM) that includes a set of states $\mathcal{S}$ and d functions:

$$s_j = f_j\left(PA^{\mathcal{G}}(s_j), \epsilon_j\right), j \in [d] \tag{3}$$

Where $$PA_j^{\mathcal{G}}$$

$\subset \{s_1, \ldots, s_j\} \backslash \{s_j\}$ are the parents of $s_j$ in the directed acyclic graph (DAG) $\mathcal{G}$ and $\varepsilon = \{\epsilon_1, \ldots, \epsilon_d\}$ follows a joint distribution over the noise variables $\epsilon_j$, which are jointly independent. The historical context data 402 includes sequences of training states, training actions, training rewards, and training costs determined based on real world sequences of video images, lidar images, and BEV images.

During training, machine learning system 400 inputs historical context data 402 for time steps H, . . . , t that includes training states $\{s_H, \ldots, s_{t-1}, s_t\}$, training actions $\{a_H, \ldots, a_{t-1}, a_t\}$, training rewards $\{r_H, \ldots, r_{t-1}, r_t\}$, and training costs $\{c_H, \ldots, c_{t-1}, c_t\}$. During training machine learning system learns to determine states, actions, rewards, and costs for time step t from historical data from time steps t−H, . . . , t−1 according to the functions in equation (3). At inference time, given input that includes historical data for time steps t−H, . . . , t−1, trained machine learning system will be able to output a joint prediction 404 for a state $s_t$, action $a_t$, reward $r_t$, and cost $c_t$ for a current time step t.

Training a machine learning system 400 includes supplying the machine learning system 400 with example sequences of historical context data 402 as examples and forming loss functions based on comparing the joint prediction 404 sequences output by the machine learning system 400 with the supplied historical context data 402. The loss functions can be formed based on the joint prediction 404 sequences and the historical context data 402. Weights used to program the layers included in the machine learning system 400 can be varied to minimize the loss function over many, typically at least thousands, runs of the machine learning system 400. Training runs of the machine learning system 400 can be repeated until the loss function converges on a global or local minimum or a maximum number of runs is reached.

Training the machine learning system 400 is enhanced by decomposing the machine learning system 400 into disjoint components that include a reward model, a cost model, factorized state-action dynamics, and policy optimization. The machine learning system 400 is decomposed into disjoint components by determining "critic functions" on states, actions, rewards and costs output by the machine learning system 400. Critic functions are functions that can be used to train the machine learning system 400 by comparing output of the critic functions to states, actions, rewards and costs from recorded sequences. The disjoint components that include a reward model, a cost model, factorized state-action dynamics and policy optimization are included in the equation:

$$p(\tau_t \mid \tau_{t-H:t}) = p(a_t, s_t, R_t, C_t \mid a_{t-1}, s_{t-1} \ldots R_{t-H}, C_{t-H}) = p\left(r_t \mid PA_t^{\mathcal{G}}(r_t)\right)p\left(c_t \mid PA_t^{\mathcal{G}}(c_t)\right)p\left(a_{t+1} \mid PA_t^{\mathcal{G}}(a_{t+1})\right)\prod_{i \in dim(s)} p\left(s_{t+1}^i \mid PA_t^{\mathcal{G}}(s_{t+1}^i)\right) \tag{4}$$

Where $\tau_t$, $a_t$, $s_t$, $R_t$, $C_t$ are as defined above and $$p\left(r_t \mid PA_t^{\mathcal{G}}(r_t)\right)$$

is the reward model, $$p\left(c_t \mid PA_t^{\mathcal{G}}(c_t)\right)$$

is the cost model $$p\left(a_{t+1} \mid PA_t^{\mathcal{G}}(a_{t+1})\right)$$

is the policy optimization and $$\prod_{i \in dim(s)} p\left(s_{t+1}^i \mid PA_t^{\mathcal{G}}(s_{t+1}^i)\right)$$

is the factorized dynamics. The parent function $$PA_j^{\mathcal{G}}$$

is determined based on the parent sequence as defined above in relation to equation (3). Factorized dynamics $$\prod_{i \in dim(s)} p\left(s_{t+1}^i \mid PA_t^{\mathcal{G}}(s_{t+1}^i)\right)$$

reduces the dimension of the result from the parent function $$PA_j^{\mathcal{G}},$$

which is dimensioned based on the number of states included in the parent sequence, to a single dimension.

A learning objective for a predicted trajectory $\mathcal{L}_{traj}$ can be determined based on trajectory optimization in the machine learning system 400 by estimating the components of equation (4):

$$\mathcal{L}_{traj} = -\log p(\tau_{t-1} \mid \tau_{t-H:t}) = -\log p\left(R_t \mid PA_t^{\mathcal{G}}(R_t)\right) - \log p\left(C_t \mid PA_t^{\mathcal{G}}(C_t)\right) - \log p\left(a_{t+1} \mid PA_t^{\mathcal{G}}(a_{t+1})\right) - \sum_{i \in dim(s)} \log p\left(s_{t+1}^i \mid PA_t^{\mathcal{G}}(s_{t+1}^i)\right) = \mathcal{L}_{rtg} + \mathcal{L}_{ctg} + \mathcal{L}_{act} + \mathcal{L}_{dyn} \tag{5}$$

Where $\mathcal{L}_{rtg}$ is the reward critic, $\mathcal{L}_{ctg}$ is the cost critic, $\mathcal{L}_{act}$ is the policy optimization, and $\mathcal{L}_{dyn}$ is the factorized dynamics. The machine learning system 400 can be trained by comparing the learning objectives $\mathcal{L}_{traj}$, $\mathcal{L}_{rtg}$, $\mathcal{L}_{ctg}$, $\mathcal{L}_{act}$ and $\mathcal{L}_{dyn}$ to trajectories, costs, rewards, actions and factorized dynamics from the recorded sequences. Factoring the learning objectives as trajectory optimizations enhances training of a machine learning system 400 by including a better structural awareness of the trajectory based on state, action, reward, and cost.

Figure 5:
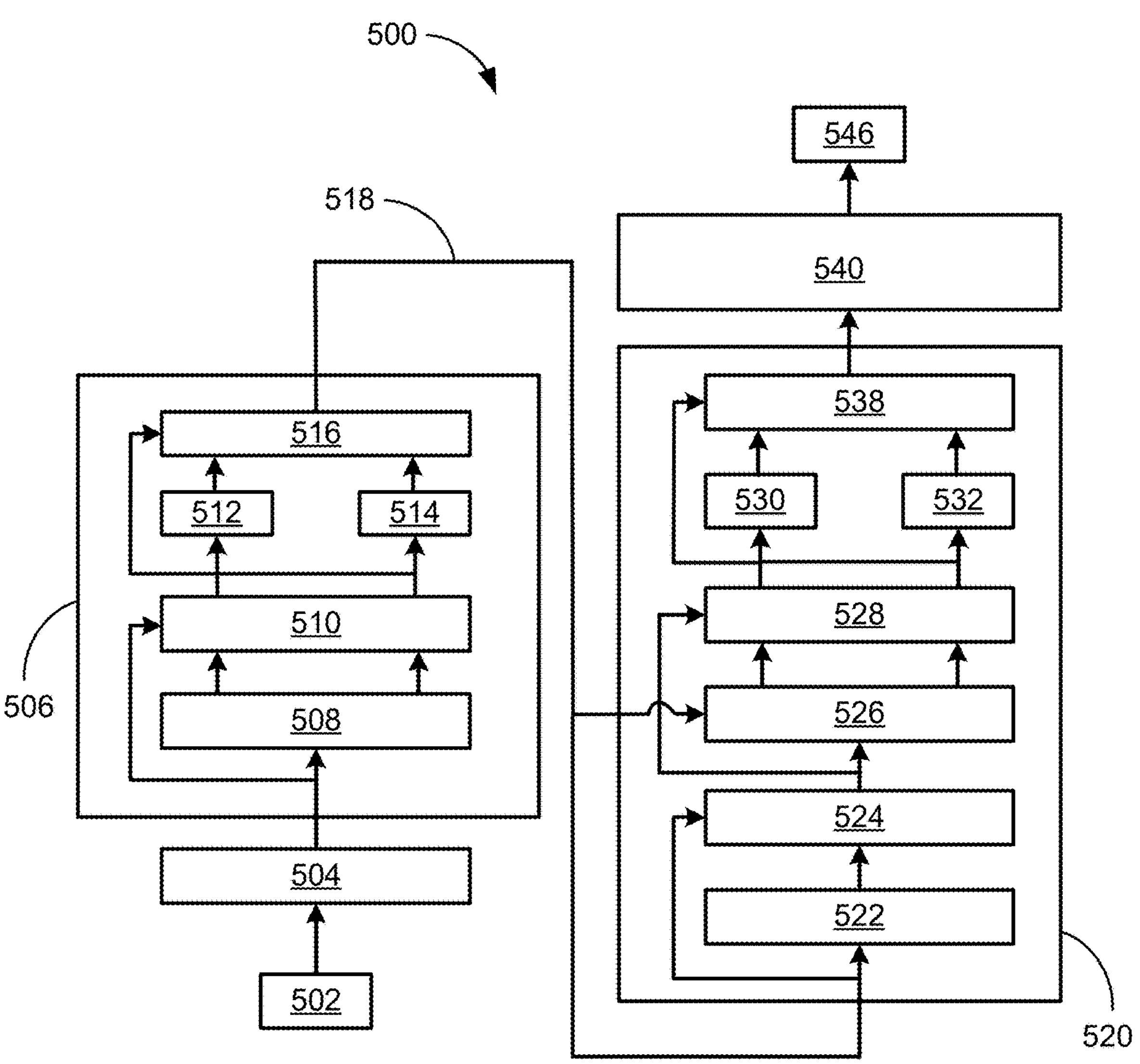
FIG. 5 is a diagram of an example transformer.

FIG. 5 is a diagram of a transformer neural network 500 machine learning system. A transformer neural network 500 is a machine learning architecture that can be used to implement a machine learning system 400 based on sequences of MDP historical context data 402 because a transformer neural network 500 can handle large amounts of training data efficiently. For example, training a transformer neural network 500 can result in billions of parameters being stored for recall at inference time. A transformer neural network 500 an attention-based sequence-to-sequence encoder-decoder architecture that can input historical context data 402, and determine an output action, state, reward, and cost. Attention-based architectures can process long-range dependencies, where results can be based on data items that are distant from each other in the input data. Attention-based architectures typically are also good at determining context, where context is defined as underlying circumstances that affect a result output from a transformer neural network 500. Context can be determined based on more than one portion of a sequence input to a transformer neural network 500.

A transformer neural network 500 can efficiently be trained using very large datasets. For example, a transformer neural network 500 can produce results efficiently by sampling portions of intermediate results generated by the billions of parameters stored as training data. Differences in sampling between one run of a transformer neural network 500 to the next can cause a transformer neural network 500 to be non-deterministic, meaning that a transformer neural network 500 can produce different results for more than one run based on the same input prompt. Training a transformer neural network 500 using a bisimulation architecture as described in relation to FIG. 6 can permit a transformer neural network 500 to behave more deterministically and repeatably output similar results based on similar inputs.

A transformer neural network 500 includes attention-based processing to efficiently process large input sequences. Attention-based processing can encode input sequences as tokens in a multi-dimensional vector. Relationships between pairs of tokens can be encoded as additional vector dimensions that can connect tokens at any distance within the input text in one step to efficiently encode relationships between data items that can be separated in the input sequence 502.

A transformer neural network 500 can include multiple encoder blocks 504 followed by multiple decoder blocks 520. Encoder blocks 504 include multiple layers which determine relationships between tokens extracted from the MDP data in the input sequence 502 based on weights determined at training time. The encoded input sequence 502 is output by an encoder block 504 as latent variables 518, so-called because the latent variables 518 are not typically visible outside of the transformer neural network 500. The latent variables 518 are then processed by one or more decoder blocks 520, which process the tokens and relationships included in the latent variables 518 to generate an output prediction 546.

Input sequence 502 is received by encoding block 504, which encodes the input sequence 502 as a multi-dimensional vector. The multi-dimensional vector includes tokens which indicate objects and links that indicate relationships between the objects in the input sequence. Tokens are numeric values that indicate input embedding and positional encoding for objects in the input prompt. Input embedding tags the objects in the input sequence with semantic data indicating the identity of the object, etc., and positional encoding indicates the location relationships between objects in the input sequence.

The positionally encoded vector output by positional encoding block 504 is received by multi-head attention layer 508. Multi-head attention layer 508 is a self-attention processing layer that generates multiple intermediate results in parallel. Multi-head attention layer 508 permits transformer neural network 500 to determine results based on multiple intermediate results in a single pass. Generating intermediate data that emphasizes relationships between objects in an input sequence provides context by describing relationships between objects and can generate multiple intermediate results.

Self-attention processing by multi-head attention layer 508 can determine relationships between the tokens in input vector without additional external data. The weights or parameters included in training data input to transformer neural network 500 can determine relationships and scores for the relationships between the tokens. Multi-head attention layer 508 can determine multiple relationships and scores between multiple groups of input tokens in the same pass. Multi-head attention layer 508 outputs the relationships and scores to add and norm layer 510 where each of the relationships and scores are separately added to the positionally encoded vector and normalized to keep the data within preset limits, typically 0 to 1. This normalization is performed based on mean and variance values accumulated over the entire training dataset, thereby causing results to stay within a defined range of values. Normalization prevents outlier results from skewing the training data, which helps the training converge more quickly on valid results.

The respective multi-head outputs from add and normalize layer 510 are input to multiple feed forward networks 512, 514, where the normalized results are processed in parallel. Feed forward networks 512, 514 are fully connected neural networks that calculate linear and/or nonlinear functions based on the input normalized vector data. The output from the feed forward networks 512, 514 is combined with output from the first add and normalize layer 508 at a second add and normalize layer 516. The operation of the second add and normalize layer 516 is the same as described above in relation to the first add and normalize layer 508, where the results are normalized to a selected range, for example 0 to 1, to inhibit outlier results and enhance training.

Encoder block 504 outputs a latent vector 518 to either a subsequent encoder 506 or to a decoder block 520. Upon exiting the final encoder 506, decoder block 520 receives the latent vector 518 at the first decoder attention layer 522 which flattens the input latent vector 518 to compact the number of connections that relate tokens included in latent vector 518. Following the first decoder attention layer 522 first decoder add and normalize layer 524 normalizes the flattened vector data as discussed above to again permit rapid convergence of results during training. Following the first decoder add and normalize layer 524, second multi-head encoder-decoder attention layer 526 combines latent vector 518 with flattened vector output from first add and normalize layer 524. Output from second multi-head encoder-decoder attention layer 526 is input to second decoder add and normalize layer 528 and then to multiple feed forward networks 530, 532 to process each portion of the flattened vector data in parallel. Feed forward networks 530, 532 are fully connected neural networks that calculate linear and/or non-linear functions based on the input flattened vector data. Following the feed forward networks 530, 532 a third decoder add and normalize layer 538 normalizes the output from the feed forward networks 530, 532 as discussed above.

Transformer neural network 500 can include multiple decoder block 520. Following the final decoder block 520, Transformer neural network 500 can include a linear layer 540 which inputs the flattened vector data output by the final decoder block 520. Linear layer 540 includes a fully connected neural network that translates the flattened vector data output by the final decoder block 520 into output action, state, reward, and cost data included an output prediction 546 for final output. Transformer neural network 500 can be trained on a server computer 120 and transmitted to via network 130 to execute as a software program installed as instructions in a computing device 115 included in a vehicle 110.

Figure 6:
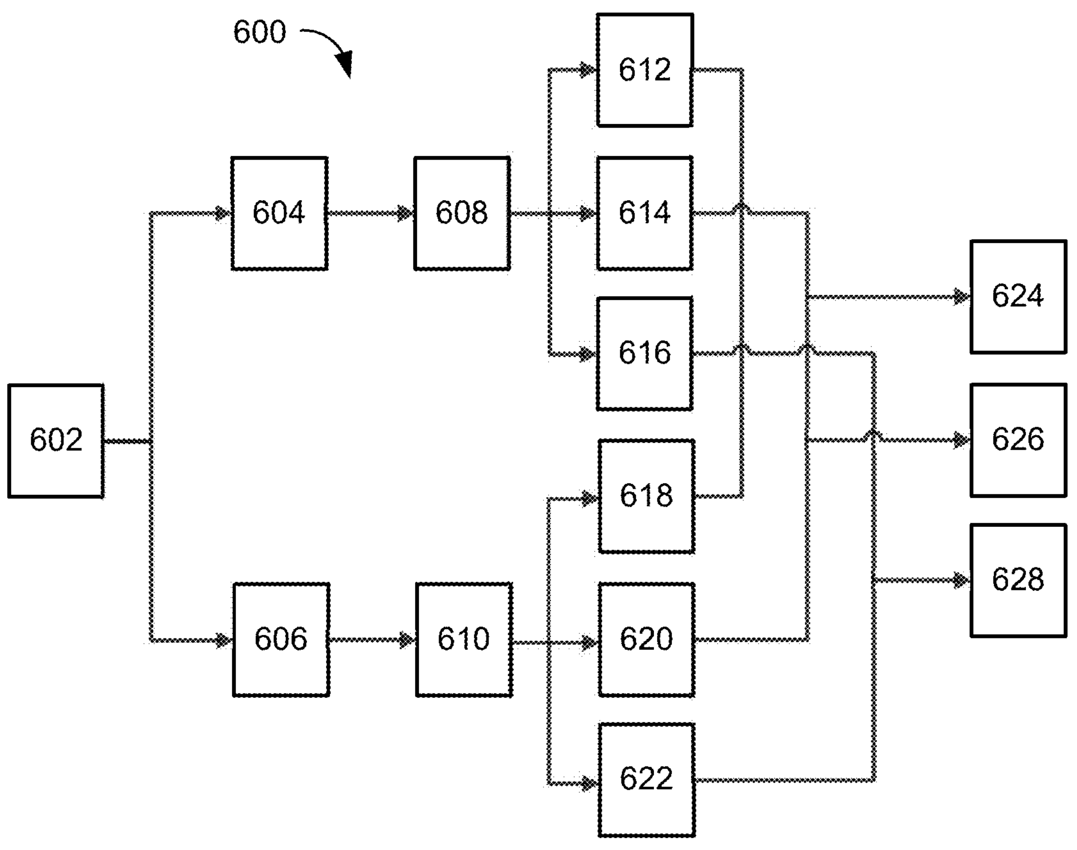
FIG. 6 is a diagram of example bisimulation training.

FIG. 6 is a diagram of a machine learning system 400 configured as a bisimulation learning system 600. Training of a machine learning system 400 based on transformer neural networks 500 can be enhanced by configuring the machine learning system 400 as a bisimulation learning system 600 by including two transformer neural networks 500 configured in parallel. Training a machine learning system 400 using a complex dataset such as a vehicle operation dataset that includes a limited number of historical context data 402 sequences can result in spurious correlations between actions and states. Training a machine learning system 400 using a bisimulation learning system 600 can enhance training of a machine learning system 400 by reducing spurious correlations between actions and states.

To reduce the occurrence of spurious correlations between actions and states, pairs of historical context data 402 sequences are determined based on similarities in stepwise transition dynamics, rewards, and costs. Similarity between pairs of historical context data 402 sequences is indicated by a bisimulation metric. A bisimulation metric $d^{\pi}$: $\mathcal{S} \times \mathcal{S} \rightarrow \mathbb{R}^{+}$ is a mapping from the state space $\mathcal{S}$ to a non-negative scalar, defined as:

$$d^{\pi}(s_1, s_2) = \mathbb{E}_{\substack{a_1 \sim \pi(\cdot|s_1), \\ a_2 \sim \pi(\cdot|s_2)}} [r(s_1, a_1) - r(s_2, a_2)| + \lambda |c(s_1, a_1) - c(s_2, a_2)| + \gamma W_2(\hat{p}(\cdot \mid s_1, a_1), \hat{p}(\cdot \mid s_2, a_2))] \tag{6}$$

Where the Lagrangian multiplier λ balances the cost term between the states and costs output from the two encoders and $W_2(\hat{p}(\cdot|s_1, a_1), \hat{p}(\cdot|s_2, a_2))$ is the 2-Wasserstein distance that measures the similarity between the two transition dynamics distributions $\hat{p}(\cdot|s_1, a_1)$ and $\hat{p}(\cdot|s_2, a_2)$. A learning objective $\mathcal{L}_{bisim}$ determined based on the two input sequences can align the state representations and enhance machine learning system 400 training by reducing spurious correlations between actions and states. The learning objective $\mathcal{L}_{bisim}$ can be defined by the equation:

$$\mathcal{L}_{bisim} = \mathbb{E}_{s_1, s_2 \sim p_{\pi_\beta}}(\|\phi(s_1) - \phi_{sg}(s_2)\|_1 - d^{\pi}(s_1, s_2))^2 \tag{7}$$

Where $\emptyset_{sg}$ means stop gradient of state encoder Ø. Minimizing the bisimulation learning objective $\mathcal{L}_{bisim}$ at training time can reduce spurious correlations between actions and states and enhance training of a machine learning system 400.

A bisimulation learning system 600 includes two encoders 608, 610 included in two transformer neural networks 500. Two data sequences 604, 606 that satisfy the bisimulation metric in equation (6) are selected from a training dataset 602 and each input to an encoder 608, 610 included in two transformer neural networks. The encoders 608, 610 encode the input data sequences 604, 606 into latent vectors 518 that are output as first estimated reward 612 $\hat{r}_1$, first estimated cost 614 $\hat{c}_1$, first transition dynamics distribution 616 $p_{s'_1}$, second estimated reward 618 $\hat{r}_2$, second estimated cost 620 $\hat{c}_2$, and second transition dynamics distribution 622 $p_{s'_2}$. First estimated reward 612 and second estimated reward 618 are combined to form reward difference 624 $|\hat{r}_1-\hat{r}_2|$, first estimated cost 614 and second estimated cost 620 are combined to form cost difference 626 $|\hat{c}_1-\hat{c}_2|$, and first transition dynamics distribution 616 is combined with second transition dynamics distribution 622 to form transition dynamics distribution difference 628 $W(p_{s'_1}\|p_{s'_2})$. The reward difference 624, the cost difference 626, and the transition dynamic distribution difference 628 are combined according to equations (6) and (7) to form a bisimulation learning objective $\mathcal{L}_{bisim}$ that can be minimized at training time by gradient search to determine a local or global minimum. Minimizing the bisimulation learning objective $\mathcal{L}_{bisim}$ can minimize differences in training between similar data sequences 604, 606, reducing differences in rewards, costs, and transition dynamic distributions between similar data sequences 604, 606. Reducing differences between rewards, costs, and transition dynamics can enhance vehicle operation by reducing differences in vehicle 110 trajectories based on outputs from a machine learning system 400 caused by small differences in input data sequences 604, 606.

Figure 7:
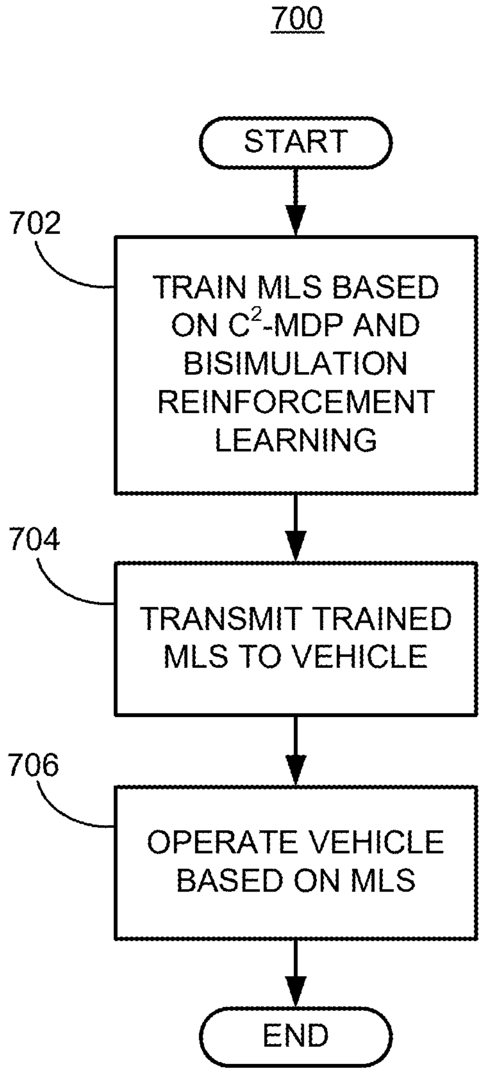
FIG. 7 is a flowchart diagram to operate a vehicle based on a trained neural network.

FIG. 7 is a flowchart diagram of a process 700 for training a machine learning system 400 to operate a vehicle 110. Process 700 can be implemented as hardware and software executing on a server computer 120 to train the machine learning system 400 and then transmitting the trained machine learning system 400 to a computing device 115 included in a vehicle 110 to operate the vehicle. Process 700 includes multiple blocks that can be executed in the illustrated order. Process 700 could alternatively or additionally include fewer blocks and can include the blocks executed in different orders.

Process 700 begins at block 702, where a machine learning system is trained on a server computer 120 using reinforcement learning based on a training dataset constructed as a $C^2$-MDP dataset including sequences of historical context data 402 that include states, actions, rewards, costs, and transition dynamic distributions between states as described above in relation to FIGS. 2-4, above. The machine learning system 400 is trained as a bisimulation learning system 600 as described in relation to FIGS. 5 and 6, above.

At block 704 the trained machine learning system 400 is transmitted to a computing device 115 included in a vehicle 110 via a network 130.

At block 706, sensors 116 included in vehicle 110 acquire video images, lidar images and combine the video images and lidar images with map data to form BEV images. The video image, lidar images, and BEV images are input to the trained machine learning system 400 included in computing device 115 to determine predictions regarding vehicle trajectories. Computing device 115 can determine commands to transmit to controllers 112, 113, 114 to control vehicle components to cause the vehicle 110 to operate on the predicted vehicle trajectory output by the machine learning system 400. Following block 706, process 700 ends.

Any action taken by a vehicle or user of the vehicle should comply with all rules and regulations specific to the location and operation of the vehicle (e.g., Federal, state, country, city, etc.). More so, any operations disclosed herein are for illustrative purposes only. Certain operations may be modified and omitted depending on the context, situation, and applicable rules and regulations. Further, regardless of the operations or determinations, users should use good judgement and common sense when operating the vehicle. That is, all operations, whether standard or "enhanced," should be followed only when proper to do so and when in compliance with any rules and regulations specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising: a computer that includes a processor and a memory, the memory including instructions executable by the processor to: operate the system based on output from a machine learning system including predicted states, actions, rewards, and costs, wherein the machine learning system includes a first transformer and a second transformer and is trained based on bisimulation offline reinforcement learning, wherein the first transformer and the second transformer are based on a Markov decision process that includes the states, the actions, the rewards, and the costs; and wherein the bisimulation offline reinforcement learning includes inputting a first sequence of training states, actions, rewards, and costs to the first transformer and a second sequence of the training states, actions, rewards, and costs to the second transformer to determine bisimulation learning objectives based on minimizing differences between latent variables including transition dynamics distributions, rewards, and costs output from the first transformer and latent variables including transition dynamics distributions, rewards, and costs output from the second transformer, respectively.

2. The system of claim 1, wherein the system includes a vehicle and operating the vehicle includes determining a vehicle trajectory based on the predicted states, actions, rewards, and costs output by the machine learning system.

3. The system of claim 1, wherein the Markov decision process is a constrained contextual Markov decision process that includes multiple sets of the states, the actions, the rewards, and the costs included in a time sequence.

4. The system of claim 3, wherein the Markov decision process includes the transition dynamics distributions and a discount factor.

5. The system of claim 1, wherein training the machine learning system based on the bisimulation offline reinforcement learning includes minimizing the bisimulation learning objectives based on the rewards, the costs, and the transition dynamics distributions included in the latent variables from the first transformer and the second transformer that includes a Lagrangian multiplier for the costs and a 2-Wasserstein distance for the transition dynamics distributions.

6. The system of claim 1, wherein the rewards are based on one or more of a vehicle longitudinal direction, a vehicle speed and a vehicle goal.

7. The system of claim 1, wherein the costs are based on one or more of not contacting objects including other vehicles, staying on a roadway, and maintaining an upper limit on vehicle speed.

8. The system of claim 1, wherein the states are based on a disjoint state space that includes a video image, a lidar image, and a bird's-eye view image.

9. The system of claim 8, wherein the bird's-eye view image is determined based on the video image and the lidar image.

10. The system of claim 1, wherein the first transformer and the second transformer transform the states, the actions, the rewards, and the costs to the predicted state based on encoding the states, the actions, the rewards, and the costs to a multi-dimensional vector, applying multi-head attention included in a decoder to the multi-dimensional vector to generate latent variables, and inputting the latent variables to an encoder that generates an output prediction.

11. The system of claim 1, wherein the sequences of the training states, the training actions, the training rewards, and the training costs used to train the first transformer and the second transformer are based on recorded real world data.

12. A method, comprising:

operating a system based on output from a machine learning system including predicted states, actions, rewards, and costs, wherein the machine learning system includes a first transformer and a second transformer and is trained based on bisimulation offline reinforcement learning, wherein the first transformer and the second transformer are based on a Markov decision process that includes the states, the actions, the rewards, and the costs; and wherein the bisimulation offline reinforcement learning includes inputting a first sequences of training states, actions, rewards, and costs to the first transformer and a second sequence of the training states, actions, rewards, and costs to the second transformer to determine bisimulation learning objectives based on minimizing differences between latent variables including transition dynamics distributions, rewards, and costs output from the first transformer and latent variables including transition dynamics distributions, rewards, and costs output from the second transformer, respectively.

13. The method of claim 12, wherein the system includes a vehicle and operating the vehicle includes determining a vehicle trajectory based on the predicted states, actions, rewards, and costs output by the machine learning system.

14. The method of claim 12, wherein the Markov decision process is a constrained contextual Markov decision process that includes multiple sets of the states, the actions, the rewards, and the costs included in a time sequence.

15. The method of claim 14, wherein the Markov decision process includes the transition dynamics distributions and a discount factor.

16. The method of claim 12, wherein training the machine learning system based on the bisimulation offline reinforcement learning includes minimizing the bisimulation learning objectives based on the rewards, the costs, and the transition dynamics distributions included in the latent variables from the first transformer and the second transformer that includes a Lagrangian multiplier for the costs and a 2-Wasserstein distance for the transition dynamics distributions.

17. The method of claim 12, wherein the rewards are based on one or more of a vehicle longitudinal direction, a vehicle speed and a vehicle goal.

18. The method of claim 12, wherein the costs are based on one or more of not contacting objects including other vehicles, staying on a roadway, and maintaining an upper limit on vehicle speed.

19. The method of claim 12, wherein the states are based on a disjoint state space that includes a video image, a lidar image, and a bird's-eye view image.

20. The method of claim 19, wherein the bird's-eye view image is determined based on the video image and the lidar image.

* * * * *